United States Patent
Wolfman et al.

(10) Patent No.: US 7,783,016 B2
(45) Date of Patent: Aug. 24, 2010

(54) APPARATUS AND METHOD FOR PRE-CALL NOTIFICATION

(75) Inventors: Shlomo Wolfman, Hod-HaSharon (IL); Shai Ophir, Moshav Ein-Vered (IL); Nir Zohar, Rishon-LeZion (IL); Li-On Raviv, Petach Tikva (IL); Ofir Sviezki, Hod-HaSharon (IL); Guy Weintraub, Ramat-Gan (IL)

(73) Assignee: StarHome GmbH, Zurich (DE)

( * ) Notice: Subject to any disclaimer, the term of this patent is extended or adjusted under 35 U.S.C. 154(b) by 1250 days.

(21) Appl. No.: 11/311,362

(22) Filed: Dec. 20, 2005

(65) Prior Publication Data

US 2006/0148459 A1 Jul. 6, 2006

Related U.S. Application Data

(60) Provisional application No. 60/636,888, filed on Dec. 20, 2004, provisional application No. 60/643,005, filed on Jan. 12, 2005, provisional application No. 60/684,978, filed on May 27, 2005.

(51) Int. Cl.
*H04M 11/00* (2006.01)
(52) U.S. Cl. .............................. 379/93.23; 379/207.15
(58) Field of Classification Search ............. 379/211.02
See application file for complete search history.

(56) References Cited

U.S. PATENT DOCUMENTS

| | | | |
|---|---|---|---|
| 7,103,167 B2* | 9/2006 | Brahm et al. | 379/211.02 |
| 7,406,324 B1* | 7/2008 | McConnell | 455/466 |
| 2002/0054674 A1* | 5/2002 | Chang et al. | 379/207.02 |
| 2002/0085687 A1* | 7/2002 | Contractor et al. | 379/76 |
| 2003/0032414 A1 | 2/2003 | Melaku et al. | |
| 2004/0120478 A1 | 6/2004 | Reynolds et al. | |
| 2004/0235455 A1 | 11/2004 | Jiang | |
| 2005/0090237 A1* | 4/2005 | Holt et al. | 455/415 |
| 2005/0169446 A1* | 8/2005 | Randall et al. | 379/93.23 |
| 2005/0186960 A1 | 8/2005 | Jiang | |
| 2006/0199575 A1* | 9/2006 | Moore et al. | 455/418 |
| 2006/0209788 A1* | 9/2006 | Boldt et al. | 370/352 |

FOREIGN PATENT DOCUMENTS

| | | |
|---|---|---|
| EP | 1289241 | 5/2003 |
| WO | WO 02/17602 | 2/2002 |
| WO | WO 2004/075484 | 2/2004 |
| WO | WO 2005/081962 | 9/2005 |

* cited by examiner

*Primary Examiner*—Creighton Smith

(57) ABSTRACT

A telephony provider apparatus comprising: a pre-call information receiver, for receiving pre-call information transmitted through a first path and associated with a phone call transmitted through a second path; and a network component, associated with the pre-call information receiver, for provisioning the pre-call information to a callee and co-ordinating connection of the associated phone call to the callee with delivery of the pre-call information. Preferably the call is connected after the callee has seen the pre-call information and actively accepted the call.

22 Claims, 8 Drawing Sheets

APPARATUS AND METHOD FOR PRE-CALL NOTIFICATION

RELATED APPLICATIONS

The present application claims priority from U.S. Provisional Patent Application No. 60/636,888, filed on Dec. 20, 2004, U.S. Provisional Patent Application No. 60/643,005, filed on Jan. 12, 2005, and U.S. Provisional Patent Application No. 60/684,978, filed on May 27, 2005, the contents of which are herein incorporated by reference.

FIELD AND BACKGROUND OF THE INVENTION

The present invention relates to apparatus and a method for pre-call notification and, more particularly, but not exclusively to such apparatus and method for use in cellular telephony including roaming cellular telephony, as well as Voice over IP (VoIP).

Today there is a basic need to know to caller identity before answering a call. Some of the fix-line phones, as well as the mobile handsets display the CLI (caller line identification) on the phone display, if available.

CLI may be used in the Integrated Services Digital Network (ISDN)—an international standard for end-to-end digital transmission of voice, data, and signaling. An ISDN connection is terminated by a Private Automatic Branch Exchange (PABX)—an exchange used for switching calls within an organization.

In some countries, the terms Caller ID (CID), Caller Display, Calling Line Identification Presentation (CLIP), Call capture, or just Calling Line Identity (CLID) are used with or instead of CLI.

CLI typically includes a number identifying the caller. In some telephony networks, when a phone switch sends out the number, the remote phone company is responsible for looking up the name of the subscriber in a common database.

One disadvantage of the CLI is that nothing ensures that the number sent by a switch is the actual number where the call originated.

Subscribers can prevent their numbers from being displayed, by dialing a special code before making a call or by a permanent arrangement with the telephony provider. In North America and some other regions, the code *67 is used for preventing the numbers from being displayed. This special code does not block the information from companies using Call capture technology.

CLI has several other disadvantages. For example: (a) The CLI is not always recognized by the callee. (b) While a cellular user is roaming in a visited network, that is a network other than the home network the cellular user is subscribed to, the CLI is not being transferred over the international lines, in several, if not in most of the cases. This disadvantage is equally true for fixed phones calling abroad or mobile phones calling mobile phones in other countries.

Furthermore, the basic need for call preview information goes beyond the information provided by CLI. Some additional information regarding the call may prove helpful for the callee, in order to decide whether to accept the call or reject it, such as the urgency of the call, the location of the caller, the charge amount, etc. For example, in roaming, the callee is paying the International part of the phone bill for the caller, so he wants to know whether to answer or not.

There are many variants to conventional CLI but all share a basic drawback of providing to the called party only information which is essentially persistent, such as a phone number, name of the caller, images of the caller etc. For example, U.S. Pat. No. 5,907,604, entitled "Image icon associated with caller ID", to Hsu, discloses a facial image of a future caller to be presented to a callee upon an incoming call initiated by the caller.

Attempts at providing enriched information with regards to the made call by the caller to the callee before the call is actually answered have been made. However, these attempts fail to teach how to synchronize the provision of enriched information to the user and the call itself.

For example, U.S. patent application Ser. No. 10/362,105, entitled "Method of and apparatus for communicating user related information using a wireless information device", to Randall, discusses the provision of presence information (such as being busy, attending a meeting etc.) from the caller to the callee and the other way around, in a pre-call basis. However, Randall fails to teach how to synchronize the provisioning of the presence information and the actual call.

There is thus a widely recognized need for, and it would be highly advantageous to have a system for delivering pre-call information which is devoid of the above limitations.

SUMMARY OF THE INVENTION

According to one aspect of the present invention there is provided telephony provider apparatus comprising:

a pre-call information receiver, for receiving pre-call information transmitted through a first path and associated with a phone call transmitted through a second path; and a network component, associated with said pre-call information receiver, for provisioning said pre-call information to a callee and co-ordinating, with said pre-call information, connection of said associated phone call to said callee in accordance with fulfillment of a predetermined condition.

According to a second aspect of the present invention there is provided telephone apparatus adapted for use by a callee to receive pre-call information, comprising:

a pre-call information receiver, for receiving pre-call information comprising media data and an associated incoming phone call; and a presenter, associated with said pre-call information receiver, for presenting said pre-call information to the callee in co-ordination with connection of said incoming phone call.

According to a third aspect of the present invention there is provided a telephone, adapted for sending pre-call information, comprising a pre-call information sender, operable for automatically sending pre-call information, to a callee substantially simultaneously with initiation of an associated phone call by a caller to said callee, said pre-call information being pre-designated for sending to said callee upon initiation of a phone call to said callee.

According to a fourth aspect of the present invention there is provided a system for processing pre-call information, comprising:

a telephony provider pre-call information receiver, for receiving pre-call information sent from a caller through a first path, and an associated phone call sent from said caller through a second path;

a network component, associated with said telephony provider pre-call information receiver, for provisioning said pre-call information to a callee and co-ordinating therewith connection of said associated phone call to said callee; and a callee pre-call information receiver, communicating with said network component, for receiving said pre-call information and said associated incoming phone call at a callee side.

According to a fifth aspect of the present invention there is provided a method for processing pre-call information, comprising:

receiving pre-call information transmitted through a first path and an associated incoming phone call transmitted through a second path; and presenting said pre-call information to a callee prior to connection of said incoming phone call.

According to a sixth aspect of the present invention there is provided a method for processing pre-call information, comprising:

receiving pre-call information transmitted through a first path from a caller and an associated phone call transmitted through a second path;

provisioning said pre-call information to a callee; and holding connection of said associated phone call to a callee until fulfillment of a predetermined condition.

According to a seventh aspect of the present invention there is provided a method for processing pre-call information, comprising:

designating pre-call information for provisioning to a callee; and automatically sending said pre-call information substantially simultaneously with initiation of an associated phone call by a caller to said callee.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
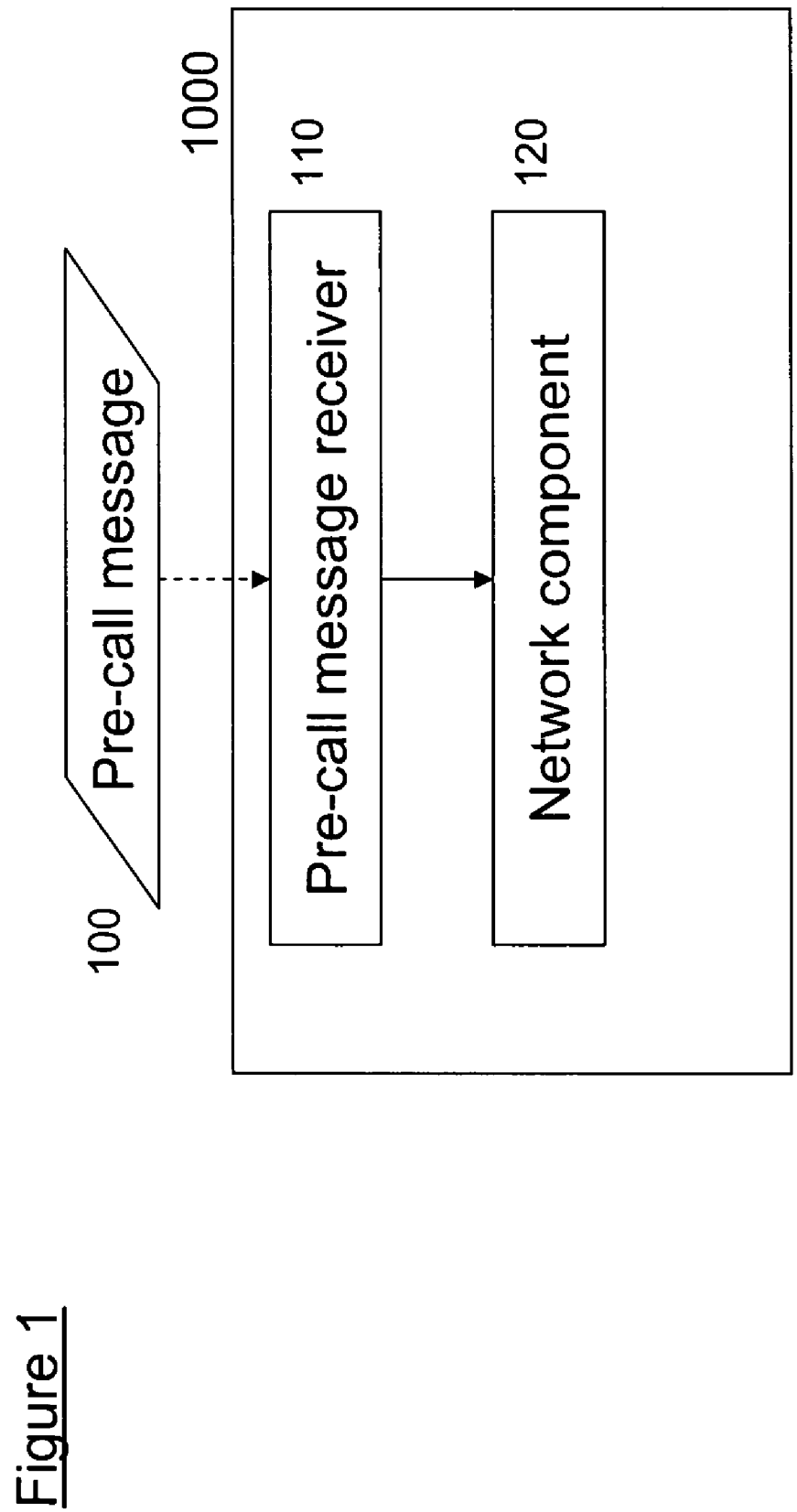
FIG. 1 is a simplified block diagram illustrating a telephony provider apparatus according to a preferred embodiment of the present invention.

The present embodiments comprise an apparatus, a system, and a method for processing pre-call information such that the pre-call information is provisioned to a called party prior to connection of a phone call associated therewith. Having been played the pre-call information, the callee may decide whether to accept the phone call or rather choose to reject, divert, or simply ignore the call. The pre-call information is provided to the user over a channel which is distinct from the channel that the phone call follows and the pre-call information reaches the callee while the phone call itself is delayed or passed along with the call, in parallel. In other words the precall information and the call are co-ordinated, allowing the callee time to see the precall information and to make his decision.

Optionally, the pre-call information is fragmented into several separate information fragments which are concatenated back by a client application running at the callee's handset. As an alternative option, the pre-call information can be run on the handset base functionality, thus a ring tone, in which case there is no specific client application.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The following embodiments teach a system and a method for providing pre-call information to a callee prior to actually connecting the call.

The pre-call information may be comprised of a voice CLI (Caller Line Identification, transferred as a voice prompt to the callee) or any other information relating to the caller or the subject of the call which is associated with the pre-call information.

Another type of pre-call information may be a call preview—a short voice message given by the caller indicating a subject of the call, an urgency of the call, or any other relevant information regarding the call, which is also transferred as a voice prompt to the caller.

Another type of pre-call information may be a textual message, sent as a flash SMS for example, or via over the air commands (OTA) to a SIM toolkit applet. Another type of pre-call information may be a data file transferred to a J2ME™ (an application-development platform for mobile devices including cell phones and PDAs) application or a Brew™ (an application development platform provided by Qualcomm™ for CDMA-based mobile phones) application or any other client application running on a mobile handset used by the callee, or by any other means.

A preferred embodiment may include sending the pre-call information to the mobile handset via Unstructured Supplementary Service Data (USSD). USSD is a current capability of GSM cellular phones. It is generally associated with real-time or instant messaging type phone services. Response times for interactive USSD based services are usually much shorter than those used for SMS.

Optionally, an interactive session with the user may also be implemented. The user may be provided the pre-call information, and only upon his/her confirmation, is the call routed to a handset used by the caller. Using USSD, the confirmation may be sent as an indication from the handset back to a call control server, used by a telephony provider/operator.

Optionally, the pre-call information sent to the callee may contain a CLI, as well as an approximate charge for the call if the call is accepted by the callee (for example, in case of roaming, where the callee is charged for the international leg), or any other relevant information.

Optionally, there may be a specific billing settlement for the duration of the pre-call message's provisioning to the callee. For example, a fixed charge may be set for the service, to be paid by the caller, the callee, or both.

Reference is now made to FIG. 1 which is simplified block diagram illustrating a telephony provider apparatus according to a preferred embodiment of the present invention.

A telephony provider apparatus 1000 according to a preferred embodiment of the present invention includes a pre-call information receiver 110, used for receiving pre-call information 100 from a caller. The caller may send the pre-call information through a first path or channel such as a data channel of the kind provided with cellular or ISDN telephony links. The channel may be carried as necessary by a connection using internet protocol (IP) over international links. The pre-call information is received by the pre-call information receiver 110 and linked with an associated phone call initiated by the caller and transmitted through a second channel such as a regular or cellular telephony channel or a combination of the two. Optionally, the pre-call information is processed by the pre-call information receiver 110 thus preparing the pre-call information for provisioning to the called party.

The telephony provider apparatus 1000 further includes a network component 120, connected to the pre-call information receiver 110, which is configured to reassociate the information from the two channels, then forward the pre-call information 100 to the callee and delay connection of the associated call to the callee for a duration of time or until a reaction is received from the callee as illustrated in greater detail herein below.

In a preferred embodiment, the apparatus 1000 is implemented using a telecommunications company (telco) platform. Such a platform may be installed at the telephony network, on a computer server, and the server may be provided at the service provider/operator's premises.

In a preferred embodiment of the present invention, the platform identifies that a call is being placed by a caller to a callee. Then, the platform may prompt the caller to provide the required voice pre-call information (say the name of the caller or a voice call preview information, as described hereinabove) to be received by the pre-call information receiver 110. Optionally, the pre-call information may be a pre-configured text message, a photo of the user, etc.

Optionally, the pre-call information may be pre-stored by the caller and designated for a specific callee or a group of callees. For example, the caller may create and store pre-call information such as a special logo or a ringtone to be sent and presented to a certain business partner or family member upon initiation of a phone call to the specific partner or family member. In addition, messages may be stored for sending to all phone numbers which are members of a particular group, say business partners. A different message may be set up for customers and yet another message may be set up for family or friends.

Optionally, the pre-call information receiver 110 is further configured to process and temporally save the pre-call information, as described hereinabove.

The network component 120 places a call to the destined callee. Before the callee answers the call, the network component 120 plays the pre-call information to the callee. The pre-call information may be played along with a system prompt (usually prior to the pre-call information) explaining to the callee that the call is preceded by pre-call information, and that the callee may disconnect the call if the callee is not interested in talking with the caller right after. Typically the callee accepts or rejects the call in the normal way.

If the call is allowed by the callee, the network component 120 connects the caller and the callee.

The pre-call information may also include a CLI. Although the CLI is currently sent over telephony networks, current methods usually fail to deliver the CLI to the callee when a phone call is connected through two or more networks. An apparatus 1000 as described hereinabove provides cellular providers/operators with the means for delivering the CLI even when a phone call is connected through two or more telephony networks, say for handling international phone calls.

Optionally, there is a specific billing settlement for the call preview, for the caller, the callee, or both. For example—a fixed charge may be billed for the service.

Figure 2:
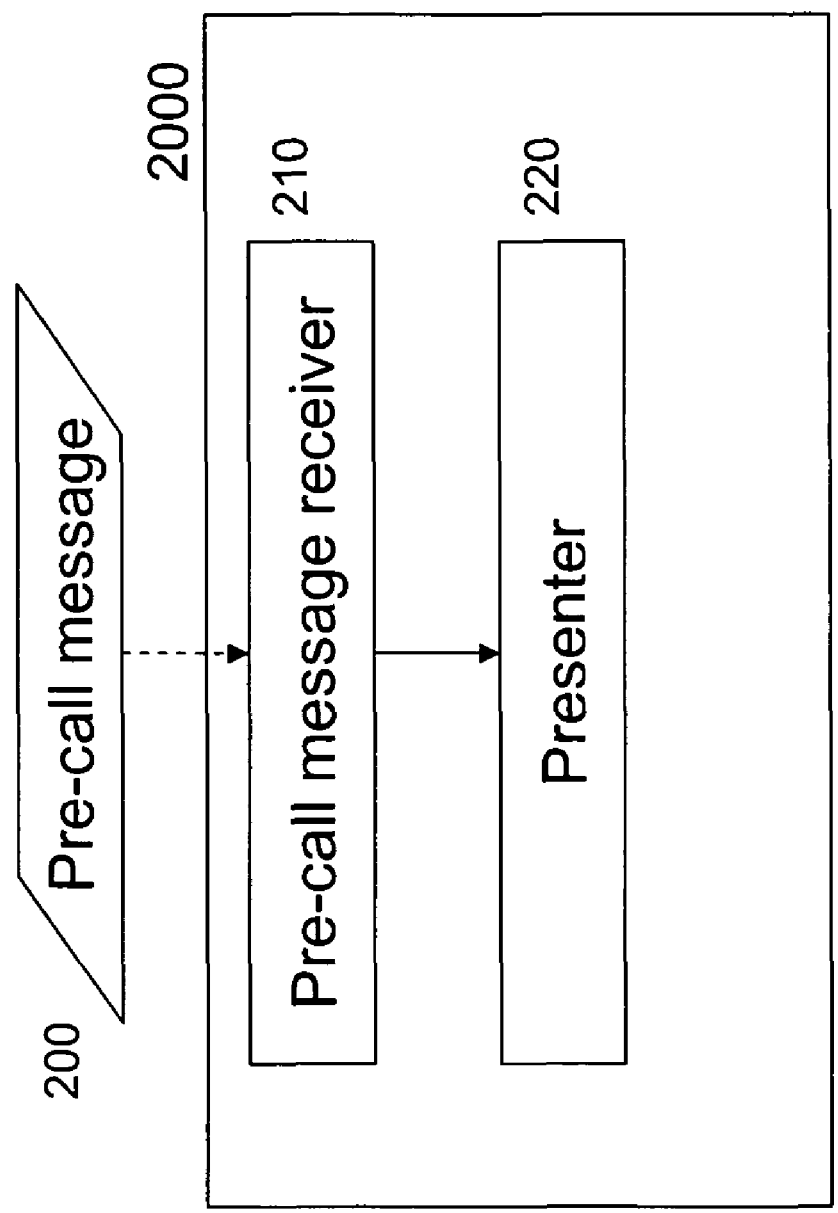
FIG. 2 is a simplified block diagram illustrating a telephony callee apparatus according to a preferred embodiment of the present invention.

Reference is now made to FIG. 2 which is a simplified block diagram illustrating a telephone according to a preferred embodiment of the present invention, as modified for use by the callee.

A telephone 2000, according to a preferred embodiment of the present invention preferably comprises a user client. The user client includes pre-call information receiver 210.

The pre-call information receiver is configured to receive the pre-call information 200, sent to the callee just before an associated call is connected itself to the callee.

As described hereinabove, the pre-call information 200 may include, but is not limited to: a voice message, a textual message, an SMS message, a ringtone a combination thereof, or any other information.

The telephone 2000 may also include a presenter 220, in association with the pre-call information receiver 210. The presenter 220 may be used to present the pre-call information to the callee prior to connection of the call associated with the pre-call information. For example, pre-call information comprising a video clip may be played to the callee by a presenter 220 implanted as a video player client, a ringtone may be played to the callee by a presenter 220 implemented as a ringtone player. In another example, a textual message such as an SMS message may be shown to the callee by such a presenter. More typically however, the appropriate player clients are likely to be present on the telephone.

Preferably, based on the information carried by the received pre-call information, the callee may now decide whether to answer the incoming call, reject the call, or to divert the call to another destination.

Figure 3:
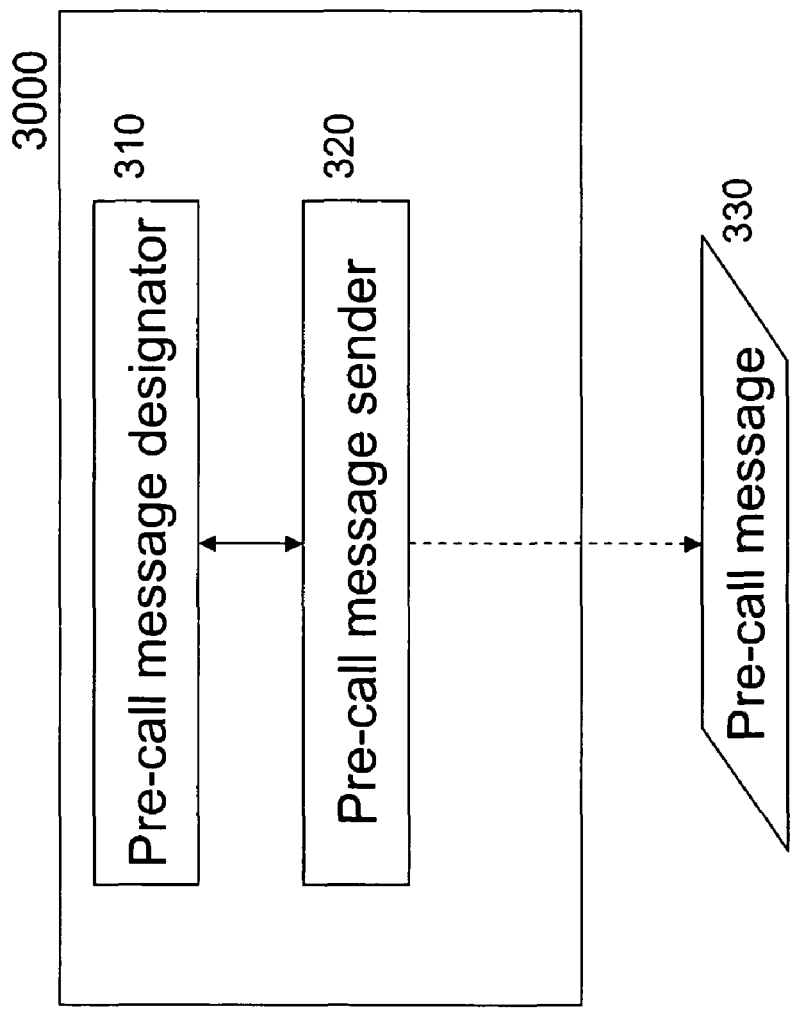
FIG. 3 is a simplified block diagram illustrating a telephony caller apparatus according to a preferred embodiment of the present invention.

Reference is now made to FIG. 3 which is a simplified block diagram illustrating a telephone according to a preferred embodiment of the present invention modified for use by a caller.

A telephony caller apparatus 3000 according to a preferred embodiment of the present invention includes a pre-call information designator 310 which may be implemented as a local application on a cellular phone used by the caller. The pre-call information designator 310 may be operated by the caller for designating information 330 as pre-call information to be provided to a certain callee or a group of callees.

The information that can be so designated may be a voice message, a text message, a photo, a ringtone, or any other message carrying information which it is desired to provide to a callee just before the call is actually connected. The information may be already present on the telephone, or may be recorded at the telephone specifically for use as pre-call information. In the latter case the designator 310 may be configured to work with media-recording clients present on the telephone.

The apparatus 3000 further includes pre-call information sender 320, configured to automatically send the pre-call information 330 when the caller initiates the phone call. That is to say, the pre-call information 330, designated by the caller by the above described pre-call information designator 310, is automatically sent by the pre-call information sender 320. A telephony provider/operator may then provide the pre-call information 330 to a callee just before actually connecting the call, as described in greater detail hereinabove.

Figure 4:
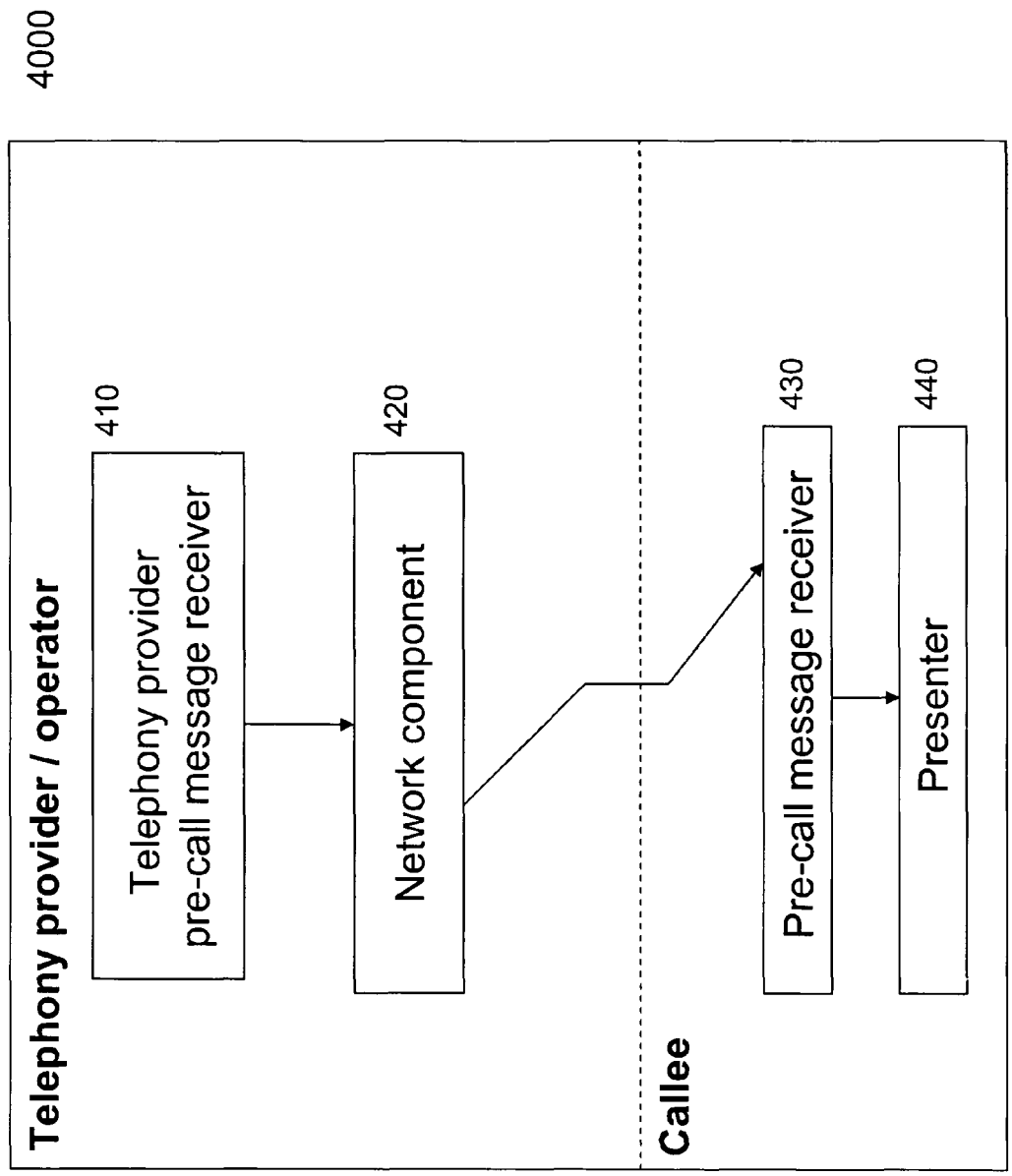
FIG. 4 is a simplified block diagram illustrating a first system for processing a pre-call information according to a preferred embodiment of the present invention.

Reference is now made to FIG. 4 which is a simplified block diagram illustrating a first system for processing pre-call information according to a preferred embodiment of the present invention.

A system 4000 for processing pre-call information according to a preferred embodiment of the present invention comprises a pre-call information receiver 410, implemented on a computer server at the side of the telephony provider/operator, in the center of a telephony network.

The pre-call information receiver 410 is used for receiving pre-call information sent from a caller through a first path as described hereinabove, and an associated phone call initiated by the caller and sent through a second path, say using a regular international connection infrastructure as described in greater detail with respect to FIG. 5 herein below. Optionally, the pre-call information is processed by the pre-call information receiver 410 thus preparing the pre-call information for provisioning to the called party.

The system 400 further comprises a network component 420, associated with the pre-call information receiver 110, at the side of the telephony provider/operator.

The network component 420 is further configured to handle the provisioning of the pre-call information to the callee and the holding of connection of the associated call to the callee until the pre-call information is played to the callee and is either accepted or rejected.

The network component 420 communicates with a callee pre-call information receiver 430, implemented at the side of the callee, say as an application running on a cellular handset operated by the callee for provisioning the pre-call information to the callee, as described hereinabove.

The callee pre-call information receiver 430 is configured to receive the pre-call information.

Optionally, the pre-call information receiver 430 is configured to communicate a presenter 440, connected to the pre-call information receiver 430 at the side of the callee. The presenter 430 may be any kind of a media playing application, such as a video player client or a wav player, which is used to present the received pre-call information to the callee.

Presenting the pre-call information to the callee may include, but is not limited to: playing a pre-call message consisting of a video clip or a ringtone to the callee or showing the callee a textual message such as an SMS message, showing the callee a photograph image of the caller, etc. as described in greater detail hereinabove.

Optionally, the presenter 440 is remotely controllable by the network component 420, for triggering the playing or showing of the pre-call information to the callee while the network components 420 holds the phone call associated with the pre-call information for a short duration of time, such that the call is connected to the callee only afterwards, as described hereinabove.

In one example, the system 4000 according to a preferred embodiment is implemented in a visited cellular network where a cellular user roams. As explained in the background the roaming user has to pay for the International leg of any incoming call and therefore wishes to know who the caller is. The CLI does not always pass over the International networks and even if it does manage to pass through it is not always possible for the user to identify the caller correctly merely from the CLI.

It will be appreciated that the system 4000 according to a preferred embodiment may also be implemented in a non-cellular telephony network as described hereinabove. Furthermore, the system 4000 may be implemented to handle a national call preceded by pre-call information.

The system 4000 may also be implemented to handle an international call being preceded by pre-call information as described herein above, unlike traditional systems where the transmission of CLI is limited to national calls. The system may 4000 be used to handle a call and pre-call information associated therewith when the call is connected by a single telephony network as well as when the call is connected through two or more networks.

A system for processing pre-call information according to a preferred embodiment of the present invention may be implemented on a telco-based platform, for facilitating a pre-call information service in a roaming cellular user scenario. Optionally, the telco platform is connected to a mobile network via an IN (Intelligent Network) interface, or by any other means that enables the telco platform to receive a trigger for Mobile Terminated (MT) calls for roaming subscribers. The trigger indicates that the call is for a roaming user and the information from the trigger can be used to tell the platform to hold the call until the associated pre-call information is provided to the callee.

An equivalent platform at the calling end may prompt a caller to provide the pre-call information, using an Intelligent Peripheral (IP) component for prompt announcement and recording capabilities. IVR (Interactive Voice Response) management systems may also be used for inquiring from the caller to obtain the pre-call information.

The platform then places a call for the callee, and before the call is answered, the platform plays a system explanatory prompt, followed by the pre-call information. Alternatively the pre-call information may be played directly.

For example, a ringtone comprising the pre-call information may be downloaded and identified to the callee's phone ringtone client and then directly played to the callee prior to receiving the call, as described in greater detail hereinabove.

If the callee decides to accept the call, the platform connects the caller and the callee, say by a network component 420, as described hereinabove.

The callee may accept the call by not disconnecting the call, by pressing a button on his handset, or by any other way. Optionally, the callee may accept the call by saying a word recognized utilizing speech recognition techniques.

Figure 5:
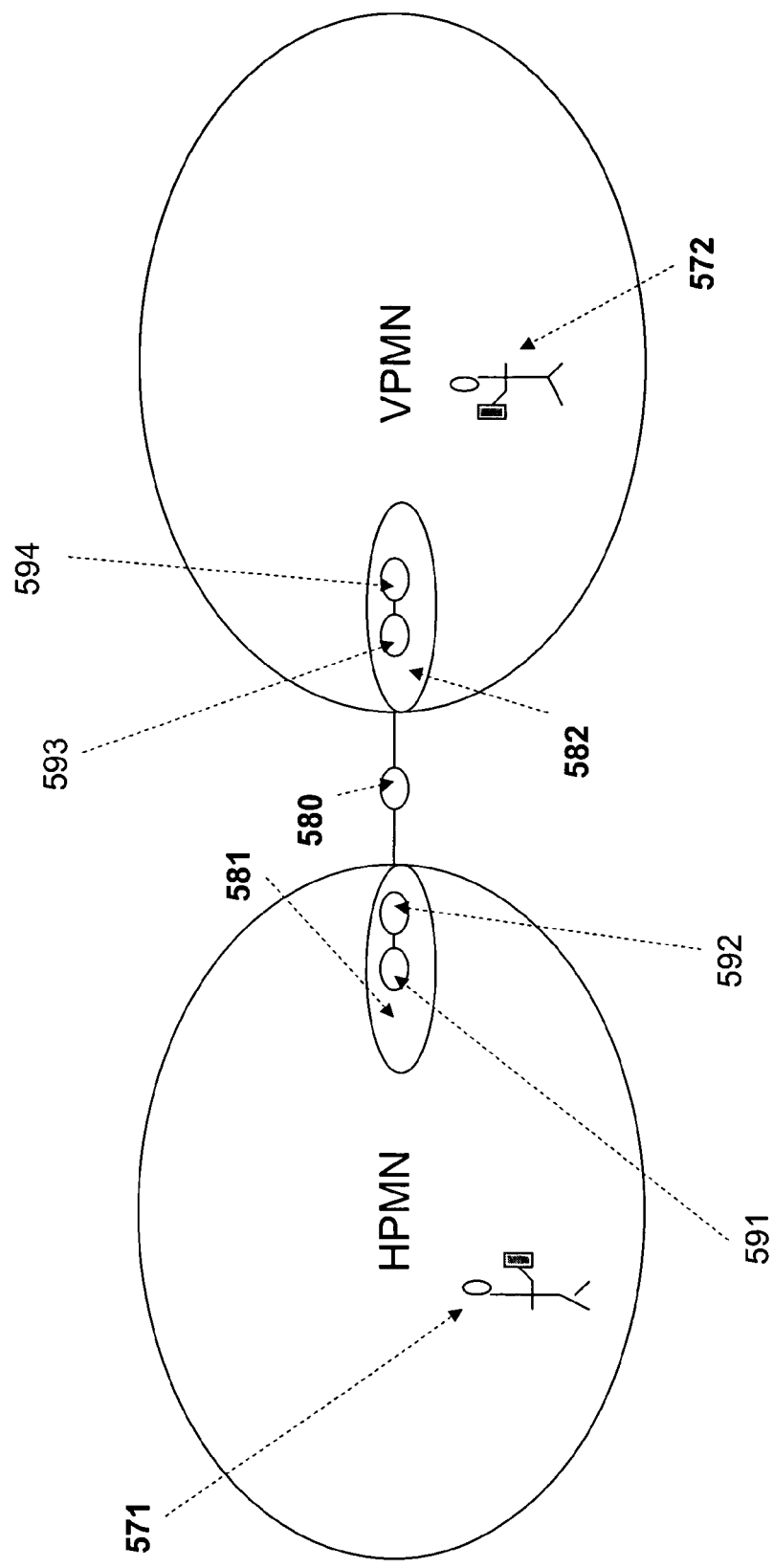
FIG. 5 is a diagram schematically illustrating a second system for processing a pre-call information according to a preferred embodiment of the present invention.

Reference is now made to FIG. 5 which is a diagram schematically illustrating a second system for processing pre-call information according to a preferred embodiment of the present invention.

In a preferred embodiment, the second system includes a telco platform 581 implementing the apparatus 1000 as described hereinabove using FIG. 1 residing on a home public mobile network (HPMN). The second system further includes a similar telco platform 582 implementing the apparatus 1000 on a visited public mobile network VPMN. The two platforms 581-582 exchange control information or data using a private internet protocol network 580 connecting the two networks. The calls themselves however are exchanged using regular International connection infrastructure. For each of the two networks, a dedicated gateway may be implemented for translation and management of communication between the cellular network and the private internet protocol network 580.

Pre-call information may be received or actually recorded by the HPMN installed platform 581, say using pre-call information receiver 591 as described hereinabove.

The pre-call information is then transferred over the private internet protocol network 580, from the HPMN installed platform 581 to the VPMN implemented platform 582, say using a network component 592, as described hereinabove. It will be appreciated that if the caller is at the VPMN then the pre-call data is transferred from the VPMN.

The VPMN implemented platform 582 may include a pre-call information receiver 593, used for receiving the pre-call information and optionally temporarily storing it.

The VPMN platform 582 places a local call to the callee 572 (who is roaming in the VPMN), and plays him the pre-call information. This call, being local, is lower cost.

Only if the call is not rejected by the callee, does the VPMN platform 582 connect the call by instructing the HPMN platform 581 to place the international call to the VPMN, and specifically to the network component 592, such that the local cell and the international call are connected into one call, connecting the caller and the callee.

If the callee does not accept the call, the local call is disconnected and the VPMN installed platform does not connect the call.

Additional information can be sent to the callee via SMS (flash SMS for example), or by any other known in the art means, as described hereinabove.

In order to ensure that the pre-call information arrives at the side of the callee before the actual connection of the call, the VPMN installed platform's network component 592 holds the call connection for a short period of time. Preferably, the duration of the short period of time is determined according to the length or the size of the pre-call information, or is set to terminate when the callee actually accepts or rejects the call.

According to a preferred embodiment of the present invention, the pre-call information including information such as the caller ID may be delivered to the callee without the need for the callee to answer the call, push a button, or take any other action in order to hear, watch, or read the pre-call information.

The following describes a variety of solutions for sending the pre-call information to the callee without a telephone call, so that the callee is delivered the pre-call information, hears, watches, or reads the pre-call information, without having to answer the call, push a button, etc.

The following solutions are relevant not only for a mobile roaming situation, but also for a non-roaming situation, i.e. for a mobile subscriber connected to and served by the home cellular network only.

Solution #1: Transferring Pre-Call Information to the Handset via IP or SMS, and Playing the Media by the Handset Several mobile handsets, running certain operating systems or certain virtual environments are capable of playing pre-call information delivered as a media file, such as a wav file.

Examples for such environments are J2ME™ and Brew™, discussed hereinabove. Both J2ME™ and Brew™ facilitate playing the media file (such as a wav file) when implemented on a cellular handset, such that the media file is played to the callee without the callee having to take any action. These platforms can identify the incoming media file and find an appropriate installed local client to play it, according to the type of the media file.

Another example may be to use a USIM card (a 3G cellular phone equivalent of a GSM cellular phone SIM card), if capable of playing a media file.

The recorded pre-call information, that may be received by information receiver 410 at the side of the telephony provider/operator, may be stored as a wav file (or any other format recognized by the handset operating system), at the premises of the service provider/operator, by the information receiver 410.

Then, the pre-call information may be downloaded to the callee's handset via an IP connection, such as a GPRS session, or by other OTA (Over The Air) means, such as a binary SMS.

Optionally, the pre-call information is fragmented into several separate information fragments which are concatenated back by a client application running at the callee's handset, as described hereinabove.

Optionally, The solution is implemented utilizing a client running on the handset, implementing a callee pre-call information receiver 430 as described hereinabove (the client 430 running in the background for example), and an open IP connection between the client and the server (in case IP transmission is being used), such that the download may be initiated by a network component 420 implemented on the server at any time.

After the file is downloaded, the client may play the information automatically, say using a presenter 440, connected with the callee pre-call information receiver 430, as described hereinabove.

The downloading and playing of the pre-call information at the handset used by the callee takes place before the actual call reaches the handset, in order for the callee to get information carried by the pre-call information before the call is actually connected. The callee may then decide whether to answer the call or not.

Therefore the telephony provider/operator's server, which has the control of the call, holds the call for a short period (few seconds), while this process takes place.

Optionally, the downloading of the pre-call information via IP is initiated by sending an Internet link to the handset. The Internet link points to a file which is located at the server. Having been sent the link, the handset's client uses the link, and automatically downloads the pre-call information from a server of the telephony provider/operator.

Solution #2: Remote Configuration of a Ringtone Containing the Pre-Call Information.

A recorded pre-call voice message, received from the caller by the telephony provider/operator, utilizing a callee pre-call information receiver 430 as described hereinabove, may be packaged as a ringtone, or embedded into a ringtone. The pre-call information may itself be a ringtone.

The packing or embedding of the pre-call information into a ringtone may be carried out by the telephony provider pre-call information receiver 410 or by a ringtone generator connected therewith, utilizing any of relevant known in the art ringtone generation methods and devices.

Then, the pre-call information is downloaded via GPRS or OTA to the callee's mobile handset being the destination of the call.

Preferably, the new ringtone is remotely configured as the currently active ringtone for the handset of the callee, say by the network component 420. The configuration may be done via known in the art remote configuration methods for a mobile handset such as the OMA (Open Mobile Alliance) standard methods for remote handset configuration, or by any other known in the art technique.

The configuration takes place before the call, in order to have the ringtone played as a ringtone for the call, when the call reaches the mobile handset. Therefore the call is held by the network component 420 of the telephony provider/operator, which has control of the call, for a short period (few seconds).

Preferably, the length of the short period is determined by the network component 420, according to the size or length of the generated ringtone. Preferably, after the call is completed, the previous ringtone is re-configured as the active ringtone for the callee's handset.

Optionally, the pre-call information may be downloaded to the handset via binary SMS, fragmented into separate SMS fragments, and concatenated back by the handset's client, as described hereinabove.

The communication between the telephony provider/operator's server and the handset of the callee, (server instructions, client responses etc.), may be based on binary SMS as well.

Figure 6:
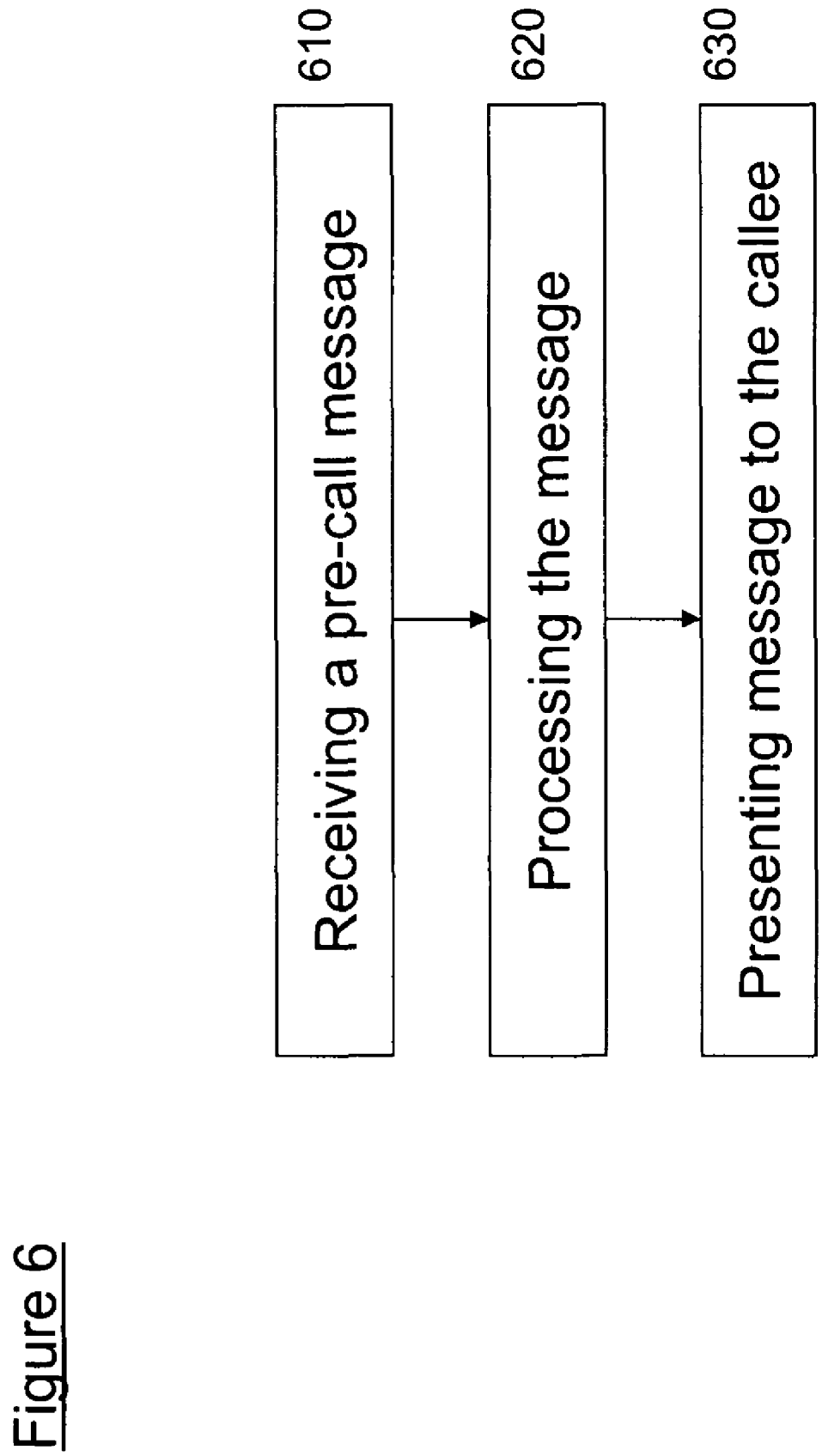
FIG. 6 is a first flow diagram illustrating a method for processing a pre-call information according to a preferred embodiment of the present invention.

Reference is now made to FIG. 6 which is a first flow diagram illustrating a method for processing pre-call information according to a preferred embodiment of the present invention.

In a method for processing pre-call information according to a preferred embodiment of the present invention, pre-call information sent from a caller to a callee through a first path such as an IP connection, just before an associated call is initiated by the caller and transmitted via another path such as a cellular telephony connection, is connected to the callee 610, as described in greater detail hereinabove.

Optionally, the pre-call information is received by the callee using pre-call information receiver 210 which is configured to receive the pre-call information 200 sent to the callee just before the incoming call associated with the information is connected itself to the callee.

As described hereinabove, the pre-call information 200 may include, but is not limited to: a voice message, textual information, a CLI, an SMS message, a picture, a video clip, a ringtone, a combination thereof, or any other information.

Optionally, the pre-call information is then processed 610 and optionally temporally saved by the pre-call information receiver 210, as described hereinabove.

Finally, the pre-call information is presented to the callee 630, say using a presenter 220, as described hereinabove. For example, the callee may be played pre-call information consisting of a video clip or a ringtone, or be shown a textual information such as an SMS message. The pre-call information is presented to the callee before the call is actually connected to the callee.

Preferably, based on the received pre-call information, the callee may now decide whether to answer the incoming call, reject the call, or divert the call to another destination, as described in greater detail hereinabove.

Figure 7:
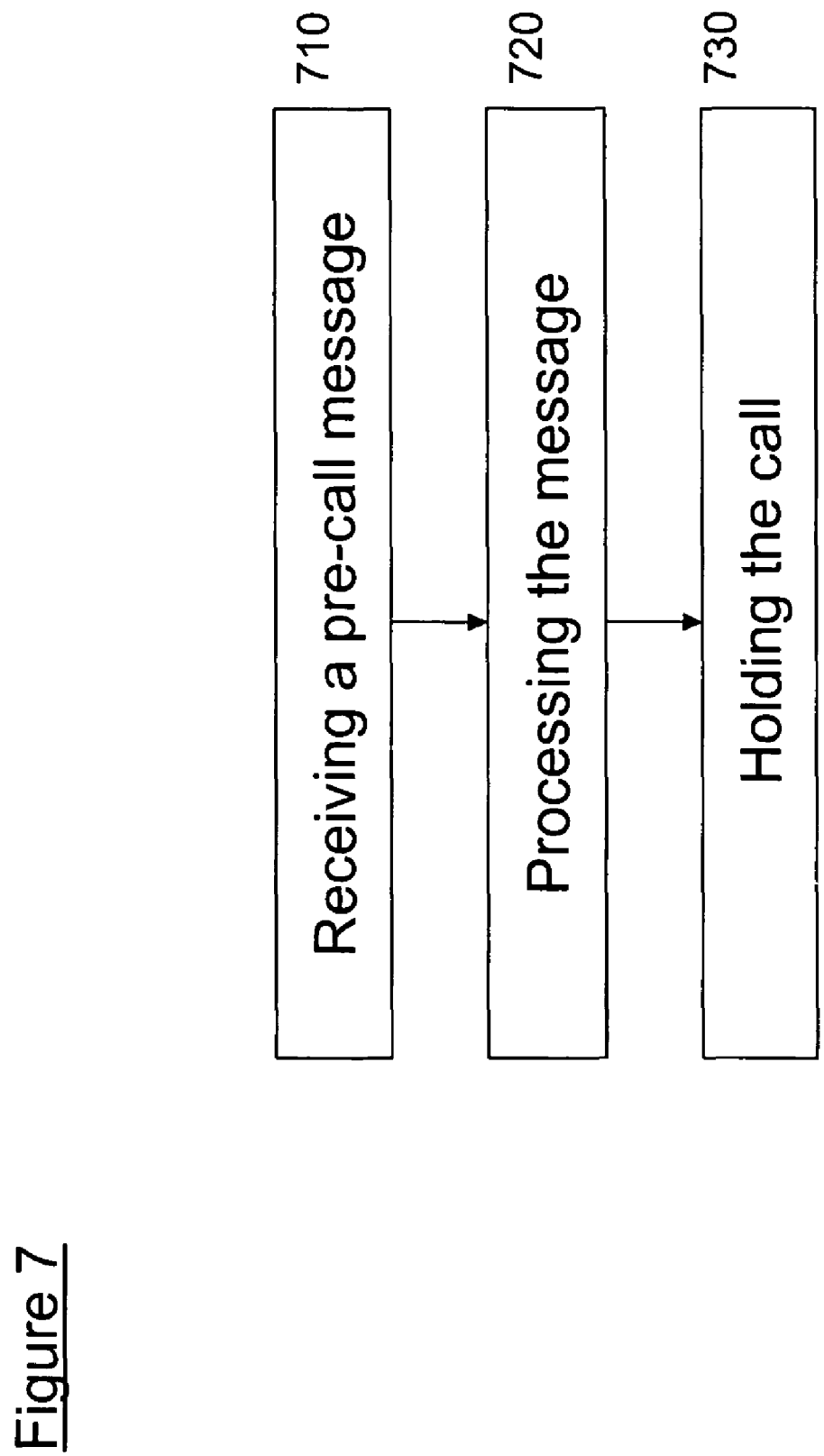
FIG. 7 is a second flow diagram illustrating a method for processing a pre-call information according to a preferred embodiment of the present invention.

Reference is now made to FIG. 7 which is a second flow diagram illustrating a method for processing pre-call information according to a preferred embodiment of the present invention.

In a method according to a preferred embodiment of the present invention, pre-call information sent by a caller via a first path is received 710, say by pre-call information receiver 110 implemented on a server at the premises of a telephony provider/operator.

Optionally, the pre-call information is then processed 720. Optionally, the processing of the pre-call information includes temporally saving the pre-call information before providing the pre-call information to the callee.

Optionally, the processing of the pre-call information further includes converting the pre-call information into another format, say by embedding it into a ringtone, as described in greater detail hereinabove.

Finally, the pre-call information is provisioned to the callee and the connecting of the call itself, which is transmitted from the user through a second path as described hereinabove, to the callee is held 730, such that the connection between the two call parties is established only after the pre-call information is delivered to the callee, as described in greater detail hereinabove.

Preferably, the establishment of the call connection between the parties is made only if the callee accepts the incoming call, as described hereinabove.

Figure 8:
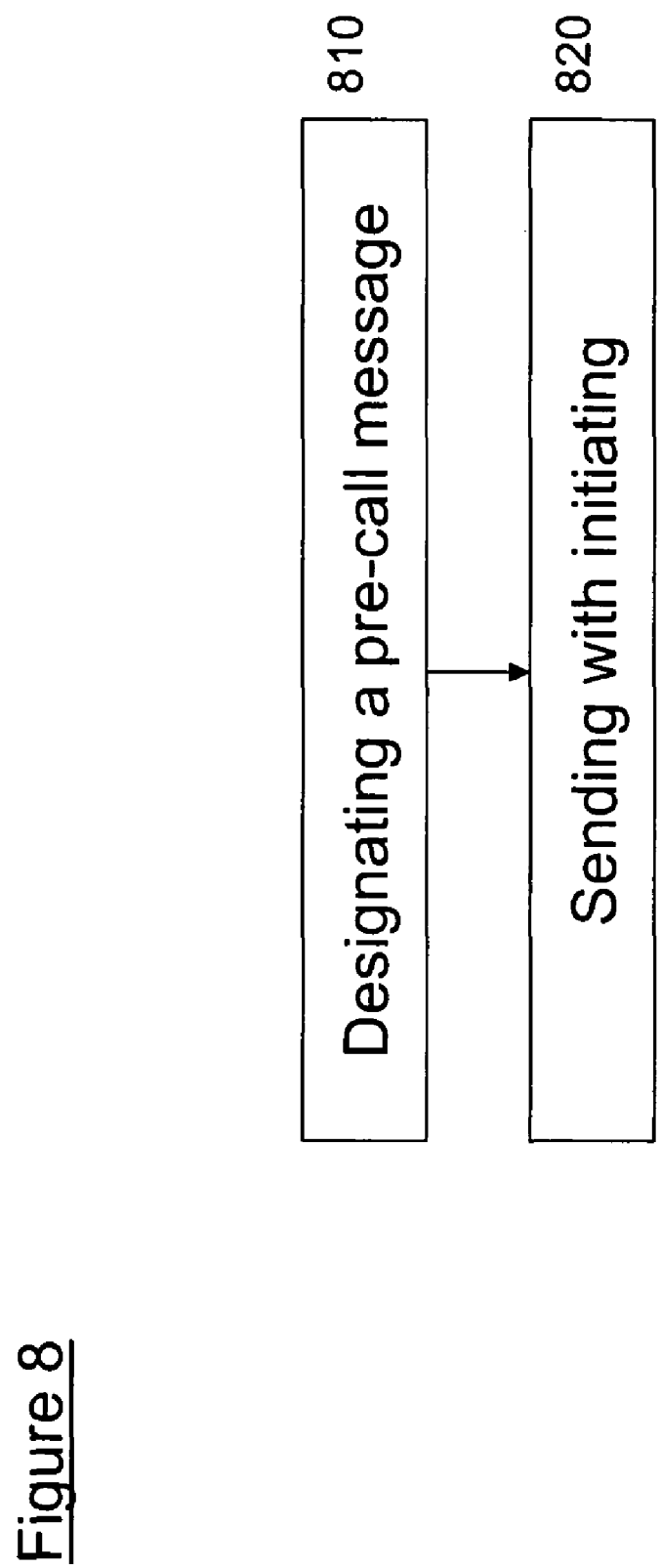
FIG. 8 is a third flow diagram illustrating a method for processing a pre-call information according to a preferred embodiment of the present invention.

Reference is now made to FIG. 8 which is a third flow diagram illustrating a method for processing pre-call information according to a preferred embodiment of the present invention.

In a method according to a preferred embodiment of the present invention, pre-call information is designated 810 for automatic sending to a certain callee or a group of callees.

The pre-call information may be a voice message, a text message, a photograph, a video clip, a ringtone or any other message carrying information to be provided to the callee and intended to indicate or at least hint at the identity of the caller.

The pre-call information is, in step 820, automatically sent substantially simultaneously with the initiation of a phone call associated with the pre-call information, as described in greater detail hereinabove.

It is expected that during the life of this patent many relevant devices and systems will be developed and the scope of the terms herein, particularly of the terms "Wav", "SMS", "CLI", "ISDN", "IP", and "USIM", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Telephony provider apparatus comprising:
    a pre-call information receiver, for receiving pre-call information transmitted through a first path and associated with a phone call transmitted through a second path; and
    a network component, associated with said pre-call information receiver, for provisioning said pre-call information to a callee, said provisioning providing unconditional playing of said pre-call information at said callee prior to connection of said call, and co-ordinating, with said pre-call information, connection of said associated phone call to said callee in accordance with fulfillment of a predetermined condition, said connection following said unconditional playing of said pre-call information, wherein said predetermined condition is one member of the group consisting of the passage of a preset duration and the receipt of a call acceptance response from said callee.

2. The telephony provider apparatus of claim 1, wherein said paths include an international telephony link.

3. The telephony provider apparatus of claim 1, wherein said paths include a cellular link.

4. The telephony provider apparatus of claim 1, wherein said paths include a link between two cellular networks.

5. The telephony provider apparatus of claim 1, wherein said paths are one member of the group comprising national and international.

6. The telephony provider apparatus of claim 1, wherein said first path is a data path terminating at a callee telephone and said second path is a voice path terminating at said callee telephone.

7. The telephony provider apparatus of claim 1, wherein said network component is further configured to determine said duration of time according to size of said pre-call information.

8. The telephony provider apparatus of claim 1, wherein said network component is further configured to remotely trigger automatic presenting of said pre-call information to said callee.

9. Telephony provider apparatus comprising:
    a pre-call information receiver, for receiving pre-call information transmitted through a first path and associated with a phone call transmitted through a second path; and
    a network component, associated with said pre-call information receiver, for provisioning said pre-call information to a callee, said provisioning providing unconditional playing of said pre-call information at said callee prior to connection of said call, and co-ordinating, with said pre-call information, connection of said associated phone call to said callee in accordance with fulfillment of a predetermined condition, said connection following said unconditional playing of said pre-call information wherein said network component is further configured to provision said pre-call information to said callee as a plurality of separate fragments.

10. The telephony provider apparatus of claim 1, wherein said network component is further configured to provision said pre-call information to said callee using an internet link.

11. The telephony provider apparatus of claim 1, wherein said pre-call information receiver is further configured to embed said pre-call information into a ringtone.

12. The telephony provider apparatus of claim 1, wherein said first path and said second path are first and second channels respectively along a single pathway.

13. The telephony provider apparatus of claim 12, wherein said first and second channels respectively are configurations of said pathway for respectively different media.

14. The telephony provider apparatus of claim 1, further comprising a ringtone generator for embedding said pre-call information into a ringtone.

15. The telephony provider apparatus of claim 1, wherein said pre-call information is provisioned to said callee as a ringtone and said network component is further configured to remotely set said ringtone as an active ringtone for a device used by said callee.

16. Telephone apparatus adapted for use by a callee to receive pre-call information, comprising:
    a pre-call information receiver, for receiving pre-call information comprising media data and an associated incoming phone call; and
    a presenter, associated with said pre-call information receiver, for presenting said pre-call information to the callee, said presenting comprising playing said media data unconditionally in co-ordination with subsequent connection of said incoming phone call following fulfillment of a condition, wherein said pre-call information comprises a plurality of separate fragments and said receiver is further configured to concatenate said plurality of separate fragments, for re-assembling said pre-call information prior to said presenting.

17. The telephone apparatus of claim 16, wherein said pre-call information receiver is remotely controllable by a telephony provider.

18. The telephone apparatus of claim 16, wherein said pre-call information is vocal.

19. The telephone apparatus of claim 16, wherein said pre-call information is textual.

20. The telephone apparatus of claim 16, wherein said pre-call information is an SMS.

21. Telephone apparatus of adapted for use by a callee to receive pre-call information, comprising:
    a pre-call information receiver, for receiving pre-call information comprising media data and an associated incoming phone call; and
    a presenter, associated with said pre-call information receiver, for presenting said pre-call information to the callee, said presenting comprising playing said media data unconditionally in co-ordination with subsequent connection of said incoming phone call following fulfillment of a condition, wherein said pre-call information is a flash SMS.

22. The telephone apparatus of claim 16, wherein said pre-call information is an unstructured supplementary service data (USSD) information.

* * * * *